(No Model.)

J. C. PARKER.
DEVICE FOR SWAGING DENTAL PLATES, &c.

No. 537,481.  Patented Apr. 16, 1895.

WITNESSES:
Lewis E. Flanders
O. C. Granger

INVENTOR
Joel C. Parker
BY
Luther V. Moulton
ATTORNEY.

United States Patent Office.

JOEL C. PARKER, OF GRAND RAPIDS, MICHIGAN.

DEVICE FOR SWAGING DENTAL PLATES, &c.

SPECIFICATION forming part of Letters Patent No. 537,481, dated April 16, 1895.

Application filed July 30, 1894. Serial No. 518,930. (No model.)

*To all whom it may concern:*

Be it known that I, JOEL C. PARKER, a citizen of the United States, residing at Grand Rapids, in the county of Kent and State of Michigan, have invented certain new and useful Improvements in Swaging Devices; and I do hereby declare the following to be a full, clear, and exact description of the invention, such as will enable others skilled in the art to which is appertains to make and use the same.

This invention relates to an improved swage for dental plates and other analogous articles of manufacture, and it has for its object the production of a device for the purpose stated in which the pressure upon all parts of the compound curvature of the inner mold will be practically equal without the use of water or other liquid, which latter would be disadvantageous for the present purpose, owing to its liability to get between the mold and the plate to be swaged.

To this end the invention consists in providing a presser having a working face approximating in shape to the compound curvature of the mold and acting upon granular rounded or shot-like material interposed between it and the plate to be swaged.

Figure 1:
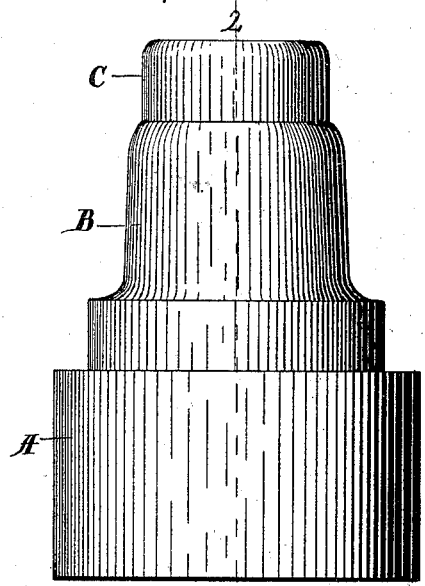
Figure 2:
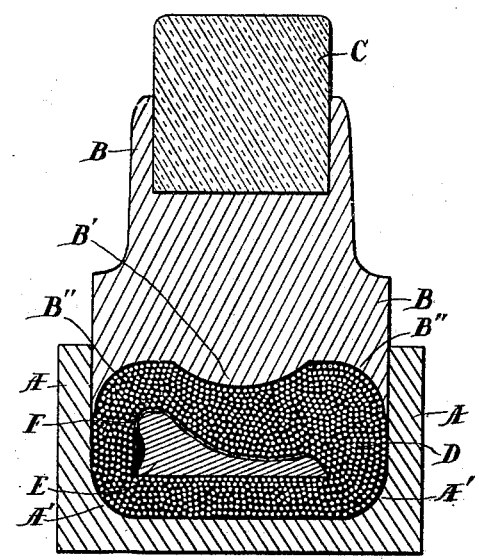
Figure 3:
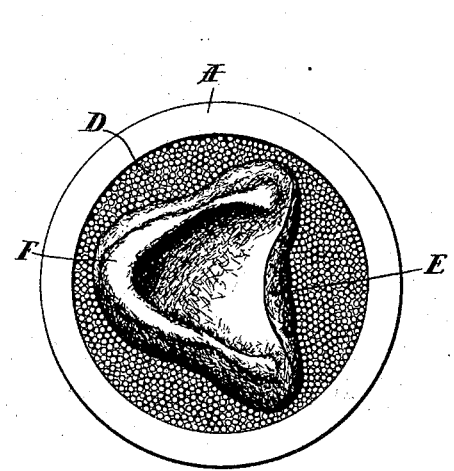

In the accompanying drawings illustrating the invention:—Figure 1 is a side elevation of a device embodying my invention. Fig. 2 is a vertical section of the same on the line 2—2 of Fig. 1, and Fig. 3 is a plan view of the lower portion or cup showing the die in place.

Like letters refer to like parts in all of the figures.

A mold E is made in the usual way from the initial impression or the plaster cast of the mouth, or of the other necessary compound-curved form to produce the desired shape and together with the plate F of aluminum, gold or any other ductile material which has been roughly formed around said mold, is placed within the cup shaped casing A. Said mold may be placed directly upon the bottom of said casing, but as it is seldom flat upon its under side, a quantity of granular rounded or shot-like material D is first preferably placed within said casing and the mold placed thereon, thus preventing said mold from being changed in form by the pressure upon it. A quantity of granular rounded or shot like material, sufficient to cover the same is then placed above and around the mold and material to be swaged and the presser B, which fits closely within the casing A, is driven into the same, by blows of a hammer or other convenient means.

It will be observed that the working face of the presser approximates in shape to the compound curvature of the mold E, being herein shown as formed with a central convex part B' surrounded by a concaved part B'', whereby the vertical action of said presser upon the granular rounded or shot-like material is converted into one acting substantially equally in all directions upon the surface of the plate being formed. This effect is assisted by curving the inner angle of the cup, as shown at A', Fig. 2.

The upper end of the presser B is preferably provided with a block of wood, C, or other suitable device to receive the blow of the hammer.

What I claim is—

1. In a swaging device, the combination with the casing, and the mold therein having a compound-curved face, of the granular rounded or shot-like material around said mold, and the presser having a working face approximating in shape to the compound curvature of said mold, substantially as described and for the purposes specified.

2. In a swaging device, the combination with the cup-shaped casing having a curved inner angle, and the mold having a compound-curved face, of the granular rounded or shot-like material around said mold, and the presser having a working face formed with a convex middle part and a concaved part surrounding said convex part, substantially as shown and described.

In testimony whereof I affix my signature in presence of two witnesses.

JOEL C. PARKER.

Witnesses:
 LUTHER V. MOULTON,
 LEWIS E. FLANDERS.